US012187125B2

(12) United States Patent
Stroebel et al.

(10) Patent No.: US 12,187,125 B2
(45) Date of Patent: Jan. 7, 2025

(54) METHOD AND DRIVER ASSISTANCE SYSTEM FOR ASSISTING A DRIVER IN DRIVING ALONG A PROXIMITY REGION OF A TRAJECTORY

(71) Applicant: Bayerische Motoren Werke Aktiengesellschaft, Munich (DE)

(72) Inventors: Michael Stroebel, Groebenzell (DE); Andreas Boesl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/711,446

(22) PCT Filed: Nov. 15, 2022

(86) PCT No.: PCT/EP2022/081986
§ 371 (c)(1),
(2) Date: May 17, 2024

(87) PCT Pub. No.: WO2023/088896
PCT Pub. Date: May 25, 2023

(65) Prior Publication Data
US 2024/0336139 A1    Oct. 10, 2024

(30) Foreign Application Priority Data
Nov. 18, 2021   (DE) .................. 10 2021 130 186.6

(51) Int. Cl.
*B60K 35/28*   (2024.01)

(52) U.S. Cl.
CPC ........ *B60K 35/28* (2024.01); *B60K 2360/166* (2024.01); *B60K 2360/176* (2024.01);
(Continued)

(58) Field of Classification Search
CPC ....................................................... B60K 35/28
See application file for complete search history.

(56) References Cited

U.S. PATENT DOCUMENTS

2011/0181540 A1 *  7/2011  Nakamura ........... G01C 21/265
                                                              345/173
2021/0031759 A1    2/2021  Urano et al.

FOREIGN PATENT DOCUMENTS

CN        101140166 A   *   3/2008
CN        101517361 A       8/2009
(Continued)

OTHER PUBLICATIONS

International Search Report (PCT/ISA/210) issued in PCT Application No. PCT/EP2022/081986 dated Mar. 16, 2023 (2 pages).
(Continued)

*Primary Examiner* — Shelley Chen
(74) *Attorney, Agent, or Firm* — Crowell & Moring LLP (57) ABSTRACT

A driver assistance system assists a driver of a motor vehicle in driving along a trajectory by displaying the trajectory on a display unit. It is identified that the vehicle is approaching a proximity region of the trajectory starting from an actual position on the basis of the fact that a plurality of different segments of the trajectory intersect, are superimposed and/or approach one another. t least one relevant segment which is relevant for the journey starting from the actual position of the vehicle is determined from the plurality of segments. The relevant segment in the display trajectory is highlighted on the display unit relative to one or more other segments of the plurality of segments.

18 Claims, 6 Drawing Sheets

(52) U.S. Cl.
CPC .. *B60K 2360/188* (2024.01); *B60K 2360/191* (2024.01); *B60K 2360/28* (2024.01)

(56) References Cited

FOREIGN PATENT DOCUMENTS

| | | | | | |
|---|---|---|---|---|---|
| CN | 101140166 | B | * | 6/2012 | |
| CN | 103140739 | A | * | 6/2013 | ............ G01C 21/00 |
| CN | 105074389 | A | * | 11/2015 | ......... G01C 21/3635 |
| CN | 108349506 | A | | 7/2018 | |
| CN | 108883776 | A | | 11/2018 | |
| CN | 104048669 | B | * | 2/2019 | ......... G01C 21/3629 |
| CN | 110148294 | A | | 8/2019 | |
| CN | 110231049 | A | | 9/2019 | |
| CN | 111332190 | A | | 6/2020 | |
| CN | 112319501 | A | | 2/2021 | |
| DE | 10 2013 015 348 | A1 | | 4/2014 | |
| DE | 10 2013 013 568 | A1 | | 2/2015 | |
| DE | 10 2020 007 050 | A1 | | 1/2021 | |
| JP | S6364724 | B2 | * | 12/1988 | |
| JP | H0861973 | A | * | 3/1996 | |
| JP | 2001324344 | A | * | 11/2001 | |
| JP | 2008-114778 | A | | 5/2008 | |
| WO | WO-2017056210 | A1 | * | 4/2017 | ............ B60K 35/00 |

OTHER PUBLICATIONS

German-language German Search Report issued in German Application No. 10 2023 130 172.9 dated Jul. 7, 2023, with partial English translation (6 pages).
Chinese-language Chinese Office Action issued in Chinese Application No. 202280071851.8 dated Aug. 3, 2024, with partial English translation (11 pages).

* cited by examiner

METHOD AND DRIVER ASSISTANCE SYSTEM FOR ASSISTING A DRIVER IN DRIVING ALONG A PROXIMITY REGION OF A TRAJECTORY

CROSS REFERENCE TO RELATED APPLICATION

This application is a 371 of International Application No. PCT/EP2022/081986, filed Nov. 15, 2022 which claims priority under 35 U.S.C. § 119 from German Patent Application No. 10 2021 130 186.6, filed Nov. 18, 2021, the entire disclosure of which is herein expressly incorporated by reference.

BACKGROUND AND SUMMARY

The invention relates to a method and a corresponding driver assistance system that are designed to assist the driver of a vehicle on a renewed transit (in particular on a return transit) along a recorded trajectory.

A vehicle may have an assistance system designed to record and store a route, in particular a travel trajectory, of the vehicle during an outward transit. For example, trajectory data relating to the travel trajectory taken by the vehicle when parking in a parking bay and/or when maneuvering can be recorded and stored.

The stored trajectory data relating to the travel trajectory on the outward transit can be used to assist the user, in particular the driver, of the vehicle on a corresponding return transit. In particular, a driving path can be displayed to the user of the vehicle on a screen of the vehicle during the return transit, the driving path being dependent on the trajectory data. The driving path can correspond to the travel trajectory taken on the outward transit. The driving path can be visualized using the camera image of the surroundings of the vehicle and/or using a schematic view.

The driving path shown on the screen of the vehicle during a return transit can be confusing to the user of the vehicle. In particular, it may be that multiple sections or segments of the driving path are visible in the camera image and/or the schematic view of the surroundings of the vehicle.

The present document is concerned with the technical object of increasing the quality of a driver assistance system for assisting the driver of a vehicle on a transit along a trajectory, in particular on a transit along a recorded trajectory, in particular with regard to the quality of the driving path displayed on the transit.

The object is achieved by each of the independent claims. Advantageous embodiments are described in the dependent claims, inter alia. It is pointed out that additional features of a patent claim dependent on an independent patent claim without the features of the independent patent claim or only in combination with a subset of the features of the independent patent claim can form a dedicated invention that is independent of the combination of all features of the independent patent claim and that can be made the subject of an independent claim, a divisional application or a subsequent application. This applies in the same way to technical teachings which are described in the description and which can form an invention that is independent of the features of the independent patent claims.

According to one aspect, a driver assistance system is described that is designed to assist a driver of a (motor) vehicle on a second transit along a trajectory recorded within the context of a (preceding) first transit. The first transit may comprise an outward transit from a first point (e.g. from a starting point) to a second point (e.g. to an endpoint). The second transit may comprise a corresponding return transit from the second point to the first point. The driver assistance system may therefore be designed to assist the driver on a return transit.

Alternatively, the second transit may comprise a repeat of the first transit (in the same direction of travel). The first transit may therefore comprise a transit from the first point to the second point, and the second transit may comprise a renewed transit from the first point to the second point.

A transit may optionally be made up of multiple moves. The transit can then take place via one or more intermediate points or via one or more further points. The direction of travel of the vehicle in this case may differ in different moves of a multi-move transit. In particular, the direction of travel can be changed (between forward and backward or between backward and forward) in each of directly successive moves. The aspects described in this document can be applied to multi-move transits. The aspects described can be applied in particular to each individual move on the multi-move transit or to the multi-move transit as a whole.

It is pointed out that the aspects described in this document are described specifically for a second transit along a recorded trajectory. However, the aspects described can be applied, individually and in combination, generically to a transit along a trajectory (e.g. along a planned or a recorded trajectory).

The driver assistance system may be configured to produce automated longitudinal and/or lateral guidance of the vehicle (e.g. within the context of the first transit and/or within the context of the second transit). Automated lateral guidance can be produced in particular within the context of the second transit. The longitudinal guidance may then optionally be produced manually by the driver. The driver assistance system may be in particular a reverse assist system and/or site parking assistance. In an alternative example, the second transit may be produced (optionally entirely) manually by the driver (with regard to the longitudinal and lateral guidance).

Within the context of the first transit, trajectory data relating to the trajectory of the first transit may have been ascertained and recorded. The trajectory data can indicate positions (e.g. within the x,y plane of a Cartesian coordinate system) of a multiplicity of waypoints on the trajectory recorded on the first transit. The trajectory data may have been ascertained on the basis of the sensor data from one or more vehicle sensors and/or on the basis of map data relating to the road used by the vehicle.

The driver assistance system may be designed to assist the driver of a motor vehicle by displaying a display trajectory, corresponding to the recorded trajectory, on a display unit. The display unit may comprise e.g. a screen or a head-up display. The display unit may be part of the vehicle or part of a (mobile) user device (e.g. a smartphone).

The driver assistance system is configured so as, during the second transit, to detect that the vehicle, starting from the actual position of the vehicle, is getting closer to a proximity region of the recorded trajectory and/or is approaching a proximity region in which a plurality of different segments of the recorded trajectory intersect, overlap and/or converge on one another. The different segments of a trajectory can also be referred to as sections or parts of the trajectory. In particular, it is possible to detect that the proximity region is arranged starting from the actual position such that the proximity region is shown on the display unit. Showing the plurality of different segments of the recorded trajectory could lead to confusion for the driver of the vehicle (in particular if two different segments intersect, overlap at least in sections, and/or converge on one another).

The driver assistance system may in particular be configured to ascertain the distance between two different segments of the recorded trajectory. It is then possible to determine that the two different segments form a proximity region of the recorded trajectory if the ascertained distance is equal to or less than a predefined distance threshold value (e.g. of 5 meters or less). It is thus particularly reliably possible to detect a proximity region for which there is no intersection of trajectory segments.

The driver assistance system may further be configured to ascertain at least one relevant segment from the plurality of segments (of the detected proximity region) that, starting from the actual position of the vehicle, is relevant to the second transit. In this case, e.g. the segment from the plurality of segments (of the detected proximity region) can be ascertained as the relevant segment on which the vehicle is supposed to drive or will drive in, through and/or from the proximity region in order to follow the recorded trajectory on the second transit. Alternatively or additionally, the driver assistance system may be configured to identify the one or more segments from the plurality of segments as relevant segments that follow the actual position of the vehicle next with regard to the direction of travel of the vehicle on the second transit.

It is therefore possible to ascertain the one or more relevant segments of the recorded trajectory that, starting from the respective actual position of the vehicle, are relevant to travelling through the detected proximity region and/or to travelling from the detected proximity region.

In addition, the driver assistance system may be configured to cause the relevant segment to be highlighted in the display trajectory on the display unit compared with one or more other segments from the plurality of segments.

A relevant segment can be highlighted in particular by: hiding or graying out or transparently representing another segment from the plurality of segments; using a different color and/or shading for the relevant segment than for the other segment from the plurality of segments; and/or displaying a symbol, in particular a direction arrow and/or a road sign and/or a pictogram, that indicates the segment relevant to the second transit.

It is therefore possible to cause the one or more segments that are directly relevant to the transit through the proximity region ahead to be highlighted in the display trajectory shown on the display unit. This allows the convenience and reliability of the driver assistance system to be increased.

The driver assistance system may be configured to ascertain the angle between two intersecting and/or converging segments of a proximity region of the recorded trajectory. It is possible to consider the angle obtained between two intersecting segments that, at the point of intersection, have a direction of travel leading away from the point of intersection or alternatively a direction of travel leading toward the point of intersection.

It may then be possible to cause the one or more relevant segments to be selectively highlighted on the basis of the ascertained angle. In particular, a relevant segment for this proximity region may be ascertained and/or highlighted only if the ascertained angle is in a predefined angle range around 0° or around 180°. The predefined angle range may be e.g. equal to or less than ±20°. The angle between the intersecting and/or converging segments can therefore be taken as a basis for checking whether or not there is actually a risk of confusion between the segments of the proximity region. If a relatively large angle results in there being no risk, highlighting can be dispensed with. This allows convenience for the driver to be increased further.

The driver assistance system may be configured to ascertain, starting from the (respective) actual position of the vehicle, a plurality of proximity regions (to be shown on the display unit) of the recorded trajectory that are in front of the vehicle in the direction of travel of the vehicle on the second transit. The one or more relevant segments in each case can then be ascertained and highlighted. This allows convenience and reliability to be increased further.

The driver assistance system may further be configured to ascertain a sequence of segments of the recorded trajectory that are driven through in succession on the second transit starting from the actual position (in particular when there are a plurality of proximity regions). The segments can therefore be successively arranged in the sequence of segments in the manner in which they are driven through on the second transit along the recorded trajectory.

It is then possible to identify the first segment from the sequence of segments that first forms a proximity region of the recorded trajectory with a segment from the sequence of segments that is in front of the first segment.

In other words, it is possible to ascertain the first segment in the sequence of segments for which a convergence or intersection with another segment from the sequence of segments that is in front of this segment in the sequence of segments could result in a lack of clarity for the driver of the vehicle.

The at least one relevant segment (which should be highlighted) can then be ascertained from the set of segments that has the one or more segments that are in front of the first segment in the sequence of segments. As such, the one or more relevant segments can be ascertained particularly precisely and robustly (in particular when there are multiple proximity regions). For example, all segments from the sequence of segments that are in front of the first segment can be highlighted. All segments from the sequence of segments from the first segment onward (including the first segment) may optionally be hidden.

The driver assistance system may be configured so as, during the second transit (typically repeated), to use at least one camera (and optionally multiple cameras) of the vehicle to ascertain image data relating to the surroundings of the vehicle that are in front of the vehicle in the direction of travel. The one or more cameras may be arranged on the front and/or the rear of the vehicle. In addition, the driver assistance system may be configured to take the image data as a basis for causing the display unit to show or output a graphical representation that displays the surroundings of the vehicle with the display trajectory overlaid. The graphical representation may comprise a video of the surroundings of the vehicle. Alternatively or additionally, the graphical representation may comprise a schematic representation of the surroundings of the vehicle (e.g. a top view representation).

The driver assistance system may be configured so as, during the second transit, to repeatedly ascertain the respective actual position of the vehicle, in particular the respective actual position of the camera of the vehicle. The display trajectory can then be updated on the basis of the respective actual position. Further, it is possible to cause the respective updated display trajectory to be shown on the display unit of the vehicle (with the respective captured surroundings of the vehicle overlaid). The display trajectory can therefore be repeatedly adjusted on the basis of the respective actual position of the vehicle (and therefore on the basis of the respective displayed surroundings of the vehicle). This allows the quality of the driver assistance to be increased further.

The driver assistance system may in particular be configured so as, during the second transit, to repeatedly ascertain whether or not, starting from the respective actual position, there is, ahead in the direction of travel, a proximity region of the recorded trajectory with at least one relevant segment. The display trajectory can then be updated on the basis of whether or not, at the respective actual position, there is, ahead in the direction of travel, a proximity region of the recorded trajectory with a relevant segment. In particular, the respective highlighted segment can be updated. This allows the quality of the driver assistance to be increased further.

As already explained earlier on, the aspects described in this document can be applied generically to a transit along a trajectory. In particular, according to another aspect, a driver assistance system is described that is designed to assist the driver of a motor vehicle on a transit along a planned trajectory by displaying a display trajectory, corresponding to the planned trajectory, on a display unit. The aspects described in this document that relate to a trajectory recorded within the context of a first transit can also be applied mutatis mutandis to a planned trajectory. The planned trajectory can relate e.g. to a parking or unparking maneuver and/or to a valet parking maneuver. The trajectory may have been planned by a planning unit of the vehicle in this instance (e.g. on the basis of the sensor data from one or more environment sensors of the vehicle).

The aspects described with regard to a "recorded trajectory" can therefore be applied mutatis mutandis to a "planned trajectory" (planned for a driving maneuver). Further, the aspects described with regard to a "second transit" can be applied mutatis mutandis to a "transit" along the planned trajectory.

The driver assistance system may be configured so as, during the transit, to detect that the vehicle, starting from the respective actual position, is getting closer to a proximity region of the planned trajectory and/or is approaching a proximity region in which a plurality of different segments of the planned trajectory intersect, overlap and/or converge on one another.

The driver assistance system may further be configured to ascertain at least one relevant segment from the plurality of segments that, starting from the actual position of the vehicle, is relevant to the transit. Additionally, the driver assistance system may be configured to cause the relevant segment to be highlighted in the display trajectory on the display unit compared with one or more other segments from the plurality of segments.

The driver assistance system may be configured to detect that the trajectory has a loop with (at least) two segments that intersect at a point of intersection and/or that overlap in an overlap region. It is possible for a region around the point of intersection (e.g. a region having a specific (predefined) radius around the point of intersection) and/or for the overlap region to be stipulated as a proximity region. In other words, the proximity region can correspond to a region around the point of intersection and/or the overlap region. Further, the segment from the two segments that intersect at the point of intersection and/or that overlap in the overlap region can be selected as the relevant segment that is closest to the actual position along the trajectory (and that is therefore driven through first on the second transit).

Alternatively or additionally, the driver assistance system may be configured to detect that the trajectory has two segments with opposite directions of travel and that a change of direction of travel of the vehicle takes place at a direction-of-travel change point between the two segments. It is then possible for a region around the direction-of-travel change point (e.g. a region having a specific radius around the direction-of-travel change point) to be stipulated as a proximity region. In other words, a region around the direction-of-travel change point can correspond to the approximately region. Further, the segment from the two segments can be selected as the relevant segment that is closest to the actual position along the trajectory (and that is therefore driven through first on the second transit).

It is therefore possible for a trajectory to be analyzed, and it is possible to detect that two different segments of the trajectory overlap (e.g. on the basis of a point of intersection or on the basis of a change of direction of travel). The region of the overlap between the segments of the trajectory can be identified as a proximity region. It is then possible to cause the relevant segment within the proximity region to be highlighted in order to increase the convenience of the driver assistance system.

It is possible for the highlighting of the relevant segment to be produced by visually moderating the one or more other (irrelevant) segments and/or representing them in a visually different manner (e.g. in a different color, for instance in a paler color than the relevant segment).

The driver assistance system may be configured to at least partially or fully transparently show and/or at least partially or fully hide the one or more other (irrelevant) segments from the plurality of segments. Alternatively or additionally, the driver assistance system may be configured to at least partially or fully transparently show and/or at least partially or fully hide one or more direction symbols, in particular arrows, on the one or more other (irrelevant) segments from the plurality of segments.

On the other hand, it is possible to cause the relevant segment to be non-transparently represented and/or not hidden and/or to cause one or more direction symbols on the relevant segment to be non-transparently represented and/or not hidden. As such, the relevant segment can be highlighted in the display trajectory on the display unit in a particularly striking manner compared with the one or more other segments from the plurality of segments.

The driver assistance system may be configured to at least partially or fully transparently show and/or at least partially or fully hide one or more segments, in particular all segments, of the trajectory (to be displayed) that come after the relevant segment. Alternatively or additionally, the driver assistance system may be configured to at least partially or fully transparently show and/or at least partially or fully hide one or more direction symbols, in particular arrows, on the one or more segments, in particular on all segments, of the trajectory (to be displayed) that come after the relevant segment.

It is therefore possible for one or more, in particular all, segments of the trajectory (to be displayed) that come after the relevant segment to be represented differently than the relevant segment (including one or more segments that, from the point of view of the actual position, come after the proximity region or the overlap with the relevant segment). As such, the relevant segment can be highlighted in the display trajectory on the display unit in a particularly striking manner compared with the one or more other segments from the plurality of segments.

The driver assistance system may be configured to highlight the relevant segment in the display trajectory on the display unit compared with the one or more other segments from the plurality of segments (in particular only) while the vehicle is arranged on a segment in front of the relevant segment in the direction of travel or on the relevant segment. The highlighting may optionally be terminated as soon as the vehicle drives onto a segment of the trajectory that comes (directly) after the relevant segment. This allows the convenience of the driver assistance system to be increased further.

According to another aspect, a (road) motor vehicle (in particular an automobile or a truck or a bus or a motorcycle) is described that comprises at least one of the driver assistance systems described in this document.

According to another aspect, a method for providing driver assistance on a second transit along a trajectory recorded within the context of a first transit by displaying a display trajectory, corresponding to the recorded trajectory, on a display unit is described.

The method comprises, during the second transit, detecting that the vehicle, starting from the actual position, is getting closer to a proximity region of the recorded trajectory and/or is approaching a proximity region in which a plurality of different segments of the recorded trajectory intersect, overlap and/or converge on one another. The method further comprises ascertaining at least one relevant segment from the plurality of segments that, starting from the actual position of the vehicle, is relevant to the second transit. In addition, the method comprises causing the relevant segment to be highlighted in the display trajectory on the display unit compared with one or more other segments from the plurality of segments.

According to another aspect, a method for providing driver assistance on a transit along a planned trajectory by displaying a display trajectory, corresponding to the planned trajectory, on a display unit is described. The method comprises, during the transit, detecting that the vehicle, starting from the actual position, is getting closer to a proximity region of the planned trajectory and/or is approaching a proximity region in which a plurality of different segments of the planned trajectory intersect, overlap and/or converge on one another. Additionally, the method comprises ascertaining at least one relevant segment from the plurality of segments that, starting from the actual position of the vehicle, is relevant to the transit. The method further comprises causing the relevant segment to be highlighted in the display trajectory on the display unit compared with one or more other segments from the plurality of segments.

According to another aspect, a software (SW) program is described. The SW program can be configured to be executed on a processor (e.g. on a control unit of a vehicle) and to thereby perform at least one of the methods described in this document.

According to another aspect, a storage medium is described. The storage medium may comprise an SW program that is configured to be executed on a processor and to thereby perform at least one of the methods described in this document.

It should be noted that the methods, devices and systems described in this document can be used both alone and in combination with other methods, devices and systems described in this document. In addition, any aspects of the methods, devices and systems described in this document can be combined with one another in diverse ways. In particular, the features of the claims can be combined with one another in diverse ways. Furthermore, features shown between parentheses are intended to be understood as optional features.

The invention is described in greater detail below on the basis of exemplary embodiments. In the figures.

BRIEF DESCRIPTION OF THE DRAWINGS

DETAILED DESCRIPTION OF THE DRAWINGS

As explained at the outset, the present document is concerned with increasing the quality of a driving assistance system, in particular with regard to the display trajectory displayed on a transit. The text below discusses a return transit on the basis of an outward trajectory recorded during an outward transit. It is pointed out that the aspects described can be applied generically to a second transit made on the basis of a trajectory that was recorded during a first transit.

Figure 1:
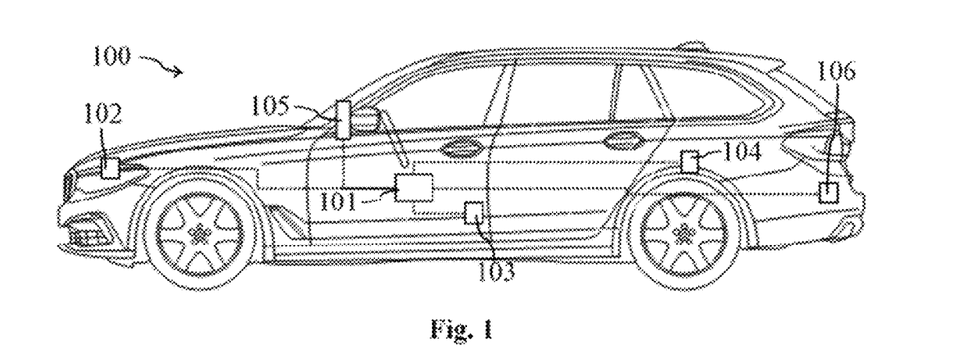
FIG. 1 shows illustrative components of a vehicle.

FIG. 1 shows an illustrative vehicle 100 having one or more environment sensors 102 (e.g. a camera, a radar sensor, a lidar sensor, etc.) and one or more vehicle sensors 103 (e.g. a steering sensor, a speed sensor, an inertial measurement unit (IMU), etc.). A (control) device 101 of the vehicle 100 may be configured to take the sensor data from the one or more environment sensors 102 and/or to take the one or more vehicle sensors 103 as a basis, during an outward transit (e.g. during a maneuver), for capturing trajectory data relating to the outward trajectory taken on the outward transit and storing them in a storage unit (not depicted) of the vehicle 100.

The vehicle 100 further comprises a reversing camera 106 configured to capture image data relating to the surroundings of the vehicle 100 ahead of the vehicle 100 in the direction of travel of the vehicle 100 on a return transit by the vehicle 100. In particular, the camera 106 can capture the surroundings to the rear of the vehicle 100 on a backward transit by the vehicle 100.

The vehicle 100 may further comprise one or more longitudinal and/or lateral guidance actuators 104 designed to produce at least partially automated longitudinal and/or lateral guidance of the vehicle 100. Illustrative actuators 104 are a drive motor, a steering device and/or a braking device. The (control) device 101 may be configured to control the one or more actuators 104 on a return transit on the basis of the trajectory data relating to the outward transit in order to assist the driver of the vehicle 100 on the return transit.

In addition, the vehicle 100 comprises a display unit 105 that may be arranged e.g. on the dashboard and/or on the head unit of the vehicle 100. The display unit 105 can comprise a screen (in particular an LCD, LED or OLED screen), a projector and/or a head-up display. The device 101 may be configured to cause the image data from the reversing camera 106 to be displayed on the display unit 105 on a return transit. In particular, the surroundings ahead of the vehicle 100 in the direction of travel can be shown (in the form of a video).

The device 101 may further be configured to take trajectory data captured during the applicable outward transit as a basis for ascertaining a return trajectory and to graphically represent said return trajectory on the display unit 105, and thus to overlay the image data from the reversing camera 106 on said return trajectory. The return trajectory (which is also referred to as the display trajectory in this document) can thus display to the user, in particular the driver, of the vehicle 100 how the vehicle 100 should be steered on the return transit, in particular in order to take the vehicle 100 back along the outward trajectory. The steering of the vehicle 100 on the return transit can be produced in automated fashion by the vehicle 100 or manually by the driver. If the steering, i.e. the lateral guidance, of the vehicle 100 is produced in automated fashion by the vehicle 100, the return trajectory shown can be an assistance for the driver in monitoring the automated lateral guidance. If the steering is produced manually by the driver, the return trajectory shown can be used by the driver as an indication of the steering that needs to be produced by the driver.

Figure 2A:
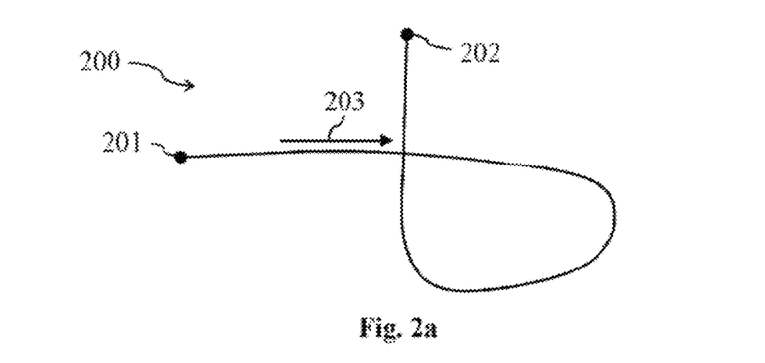
FIG. 2a shows an illustrative recorded outward trajectory.

FIG. 2a shows an illustrative outward trajectory 200 from a starting point 201 to an endpoint 202, said trajectory having been recorded and stored on an outward transit 203 (generically on a first transit). The outward trajectory 200 can have arbitrary waypoints in the plane defined by the x and y axes. The outward trajectory 200 depicted in FIG. 2a has a point of intersection between different sections (also referred to as segments) of the trajectory 200.

Figure 2B:
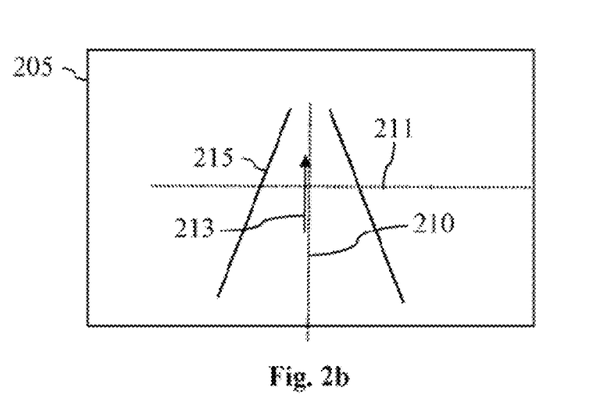
FIG. 2b shows an illustrative graphical representation of a return trajectory.

FIG. 2b shows an illustrative graphical representation 205 that can be output on the display unit 105 of the vehicle 100 during a return transit 213 (generically during a second transit). The graphical representation 205 can comprise the image data 215 from the reversing camera 106. In the example depicted in FIG. 2b, road boundaries of the road can be seen in the image data 215 in the surroundings of the vehicle 100.

The image data 215 from the reversing camera 106 can be overlaid with a (representation of the) return trajectory 210 (generically with the display trajectory) ascertained on the basis of the trajectory data relating to the outward trajectory 200. In particular, a return trajectory 210 (e.g. in the form of a driving path) can additionally be displayed on the image data 215, said return trajectory indicating to the user of the vehicle 100 how the vehicle 100 should be longitudinally and/or laterally guided on the return transit 213 (in order to take the vehicle 100 back to the outward trajectory 200 as appropriate).

If the outward trajectory 200 has intersecting segments (as depicted by way of illustration in FIG. 2a), this can lead to a situation in which the return trajectory 210 displayed on the display unit 105 also has intersecting segments 211. FIG. 2b depicts e.g. a segment 211 that runs transversely to the road boundary. Displaying different segments 211 of the return trajectory 210 may be confusing to the driver of the vehicle 100 and may possibly lead to an error when driving along the return trajectory 210.

FIGS. 3a to 3e show different, illustrative recorded trajectories 200 (in particular outward trajectories) that each have at least one proximity region 310, 320 in which different segments 301-307 of the respective trajectory 200 converge on one another or intersect. The vehicle 100 is at the actual position 300 in this case and is on a transit 213 along the direction of travel depicted by the arrows.

Figure 3A:
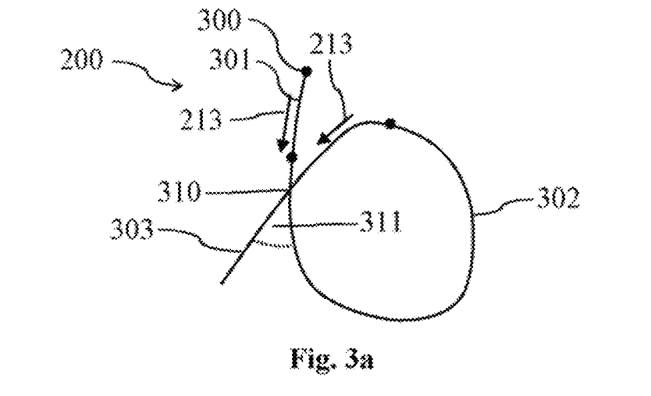
FIGS. 3a to 3e show illustrative recorded (outward) trajectories.

The trajectory 200 depicted in FIG. 3a has a point of intersection 310 between the segments 302 and 303 as a proximity region. The vehicle 100 is at the actual position 300 in the segment 301. The transitions between directly successive segments are depicted as dots in each of FIGS. 3a to 3e. At the point of intersection 310, the intersecting segments 302, 303 of the trajectory 200 form a specific angle of intersection 311. The angle 311 at the point of intersection between the intersecting segments 302, 303 of the trajectory 200 can be considered. In particular, the angle 311 at the point of intersection that between the regions of the intersecting segments 302, 303 that have a direction of travel leading away from the point of intersection (or alternatively that have a direction of travel leading toward the point of intersection) can be considered.

In particular in the case of relatively small angles of intersection 311 (e.g. of 20° or less), a situation may arise in which the display trajectory 210 corresponding to the recorded trajectory has segments 211 at the point of intersection 310 that are at such a small angle with respect to one another that the driver of the vehicle 100 cannot definitely tell which segment 211 is relevant to the lateral guidance of the vehicle 100.

Figure 3B:
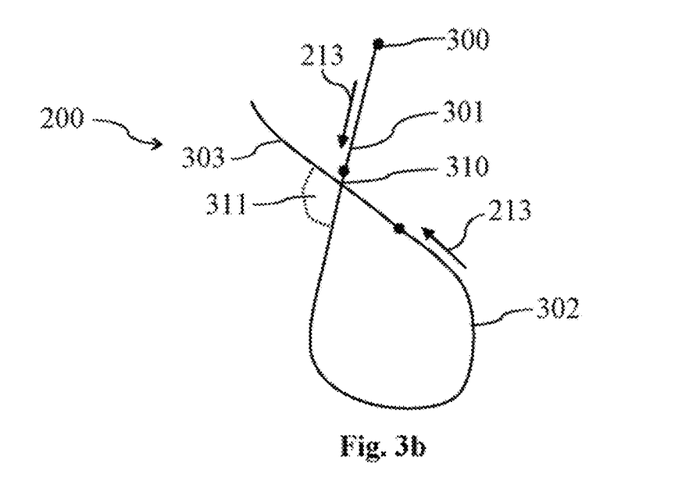

FIG. 3b shows an analogous intersection situation in which the angle of intersection 311 is so large (e.g. 160° or more) that segments 301, 303, 211 are so close together and/or have such a similar course that a confusing situation can arise for the driver of the vehicle 100.

Figure 3C:
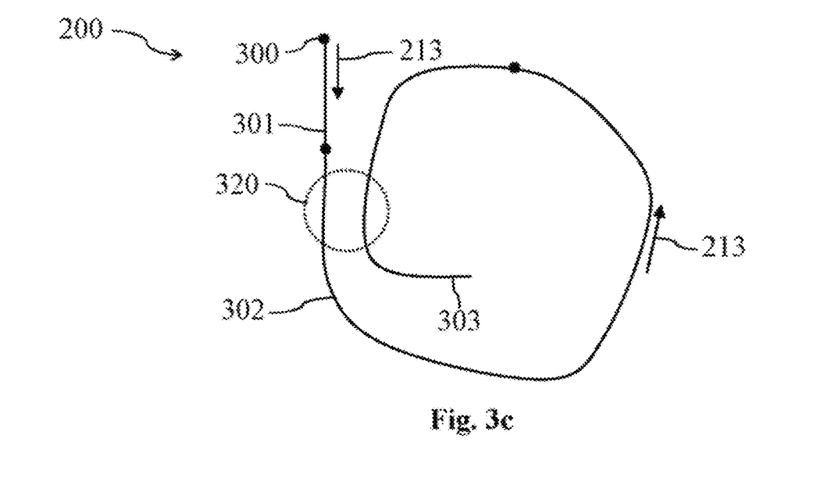
Figure 3D:
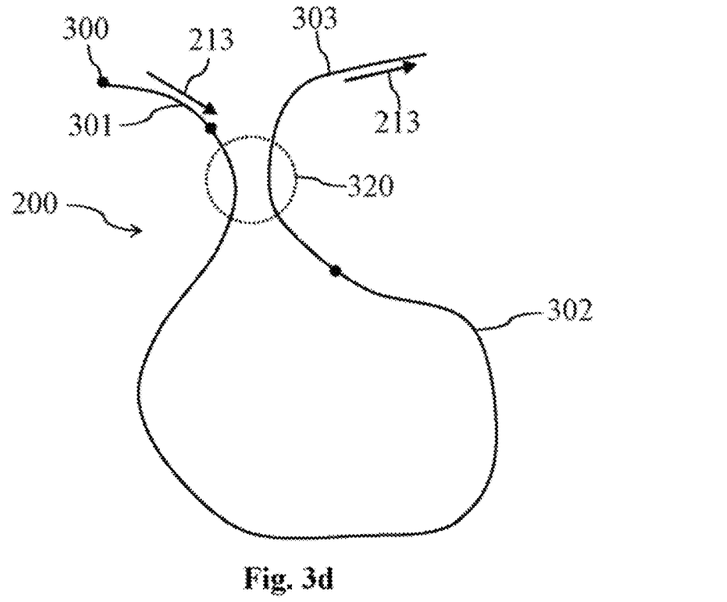

FIGS. 3c and 3d depict trajectories 200 in which different segments 302, 303 have courses that are parallel and/or relatively close to one another in a proximity region 320. In such situations too, the corresponding display trajectories 210 have segments 211 with corresponding courses, and so the driver of the vehicle 100 cannot definitely tell which segment 211 is relevant to the lateral guidance of the vehicle 100.

Figure 3E:
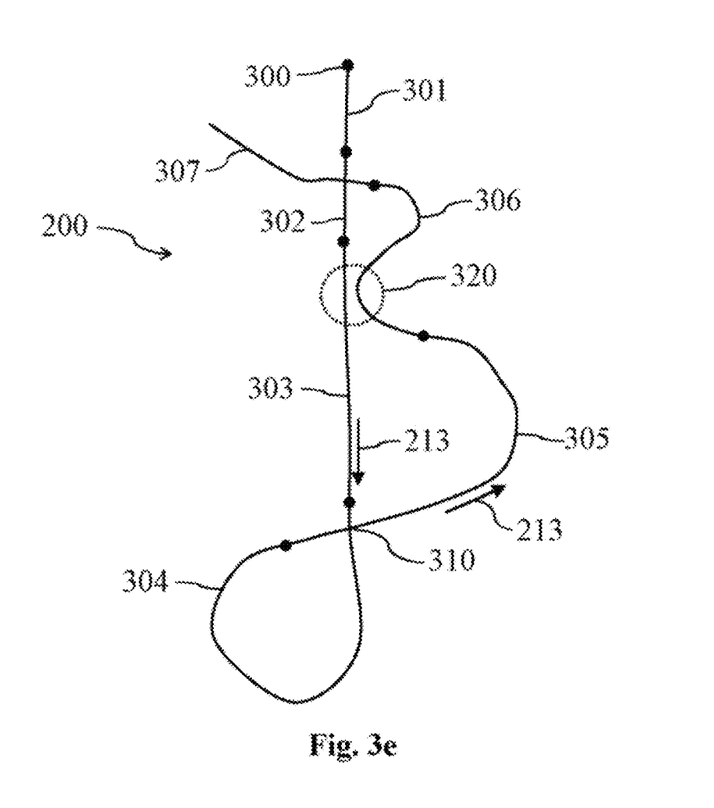

FIG. 3e shows a trajectory 200 that has multiple points of intersection 310 and a convergence region 320. In the case of such a trajectory 200, the corresponding display trajectory 210 may have multiple corresponding regions for which segments 211 that cannot be definitely attributed to the route relevant to the vehicle are shown on the display unit 105.

The (control) device 101 of the vehicle 100 and a driver assistance system comprising the device 101 may be configured to ascertain whether or not the recorded trajectory 200 for a transit, e.g. for a return transit, has a proximity region 310, 320. A proximity region 310, 320 may be a region in which the trajectory 200 has a point of intersection 310. Alternatively, a proximity region 310, 320 may be a convergence region 320 in which different segments 301, 303 of the trajectory 200 are at a distance from one another that is equal to or less than a predefined distance threshold value. The segments 301, 303 may run substantially parallel to one another in the convergence region 320.

The device 101 and/or the driver assistance system may be configured to ascertain the display trajectory 210 for the recorded trajectory 200. The display trajectory 210 can then be shown on the display unit 105 during the transit. Typically, only the portion of the display trajectory 210 that is in the region of the surroundings of the vehicle 100 that is captured by the camera 106 and reproduced on the display unit 105 is shown.

If the vehicle 100 gets closer to the proximity region 310, 320 of the recorded trajectory 200 during the transit, it may occur (as depicted by way of illustration in FIG. 2b) that multiple segments 211 of the display trajectory 210 are shown (for corresponding segments 301, 303 of the recorded trajectory 200) on the graphical representation 205 of the display unit 105.

The device 101 and/or the driver assistance system may therefore be configured to detect that a plurality of different segments 211 of the display trajectory 200 need to be shown (for a corresponding plurality of segments 301, 303 of the recorded trajectory 200) for the proximity region 310, 320. It is then possible to ascertain which segment 211 from the plurality of different segments 211 has the greatest relevance to the (lateral) guidance of the vehicle 100 (compared with the other one or more segments 211) at the respective time and/or at the respective actual position of the vehicle 100. In particular, it is possible to identify the segment 211 that is being driven through at present and/or will be driven through next.

The identified segment 211 can then be (visually) highlighted in the graphical representation 205 compared with the one or more other segments 211. This can be achieved e.g. by selecting a specific color and/or by hiding the one or more other segments 211. Highlighting the identified segment 211 allows the convenience and reliability of the driver assistance to be increased.

The relevant route that the driver assistance system will follow can therefore be displayed to the driver during a transit along a recorded trajectory 200. For this purpose, the system can detect different situations, in particular different proximity regions the 310, 320, and take them into consideration when showing the display trajectory 210. The relevant route can be displayed by hiding and/or by graying out and/or by transparently representing an irrelevant segment 211, by representing the relevant segment in a particular visual manner, by way of a direction arrow, etc.

FIGS. 3*a* and 3*b* show an illustrative intersection 310 on the recorded trajectory 200. During the transit 213, the current actual position 300 of the vehicle 100 on the trajectory 200 is compared against the stored path. If a point of intersection 310 on the path is detected and the vehicle 100 has not yet crossed this point 310 (the vehicle 100 is e.g. in segment 301), the segment 303 of the path that is situated further behind can e.g. be hidden. It can thus be seen that the vehicle will follow the segment 302 (rather than the segment 303) at the point of intersection 310.

The angle 311 between the segments 303, 302 at the point of intersection 310 may optionally be taken into consideration. The smaller the angle 311, the more difficult it is for the driver to tell which path is valid. On the other hand, it is obvious which path is being followed if the angle 311 is approximately 90°. It is therefore possible to check an angle condition, and the irrelevant path 303 may optionally be hidden only for relatively small angles 311 (see FIG. 3*a*).

A similar situation exists in the case of an intersection with a relatively large angle 311 (see FIG. 3*b*). Distinguishing between the paths is all the more difficult in this case the closer the segments 301, 303 are together, that is to say the larger the angle 311 (i.e. the closer to) 180°. In this instance, the paths may also overlap. If there is no visual direction indication in the respective segment 302, 303, this situation has the same effect as the situation in FIG. 3*a*. It is therefore possible to show a direction indication, for example, or the irrelevant path 303 can be hidden if the angle 311 is greater than a specific threshold value (e.g.) 160°.

Another situation exists when the paths 302, 303 are relatively close to one another, even if the paths 302, 303 do not intersect (see FIGS. 3*c* and 3*d*). It is then not possible for the driver to tell which path is being followed. In this situation, the distance of the two segments 302, 303 from one another can be ascertained. If the distance is equal to or less than a specific distance threshold value, the irrelevant path 303 can e.g. be grayed out and/or hidden. The direction of travel on the paths that are close together may be identical (as shown in FIG. 3*c*) or opposite (as shown in FIG. 3*d*).

FIG. 3*e* shows a situation with multiple intersections 310 and/or convergence regions 320. In such a situation, it may optionally always be possible to ascertain and highlight the segment that has an intersection 310 or a narrowing 320 next with regard to the current actual position 300 of the vehicle 100. The other segments before or after can be hidden. In other words, it is possible to analyze which segment 305, starting from the actual position 300 of the vehicle 100, first gives rise to an intersection 310 or a narrowing 320 with another segment 304 in front of it. This segment 305 and all subsequent segments 306, 307 of the trajectory 200 can then be hidden.

FIG. 3*e* indicates (by way of arrows) the direction of travel on the renewed transit 213. If the vehicle 100 is in segment 301, the segment 305 is the first segment of the trajectory 200 that forms an intersection 310 (or a narrowing 320) with a preceding segment 304 of the trajectory 200. It is then possible for all segments 305, 306, 307 that follow the segment 304 to be hidden. This makes it possible to reliably ensure that as large a portion of the trajectory 200 as possible, but not an intersection 310 or narrowing 320, is displayed to the user.

Alternatively, every segment may optionally be taken into consideration, or it is possible for a specific number of segments (e.g. three segments) that come after starting from the actual position 300 to be taken into consideration. The graduation of the relevance of the segments may optionally be visually represented (e.g. by way of different colors) in this case.

As already explained earlier on, different representations can be used to visually represent the relevance of the different segments 301-307 of a trajectory 200 in a proximity region 310, 320. Illustrative measures are: hiding and/or graying out an irrelevant segment; fading within a segment or over multiple segments; different visual representation (color/shading) of the segments; and/or use of symbols, such as e.g. arrows or no-entry signs.

Figure 5A:
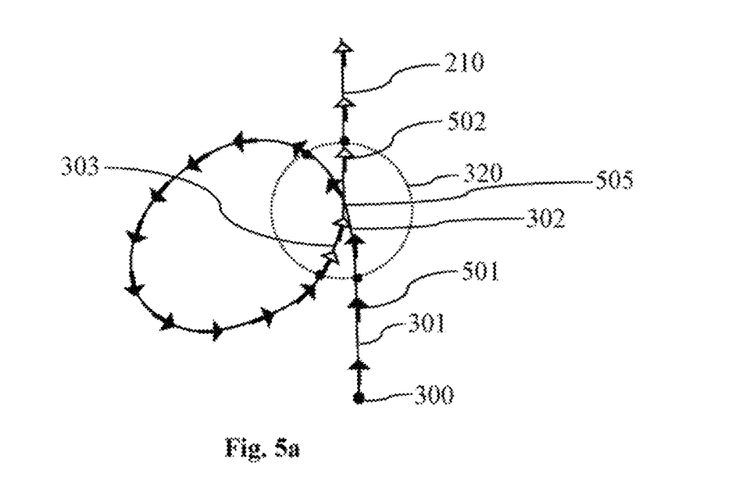
FIGS. 5a to 5d show illustrative graphical representations of a display trajectory.
Figure 5B:
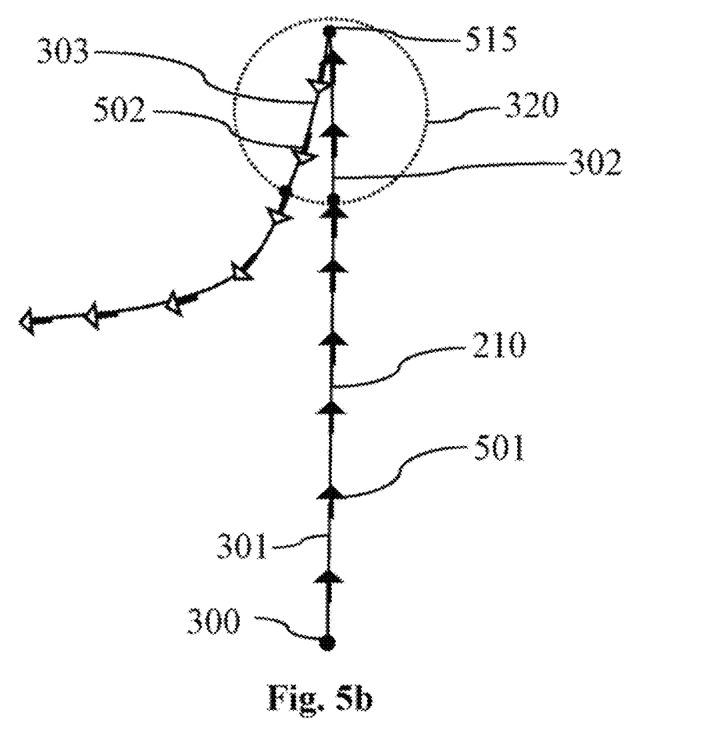

FIGS. 5*a* and 5*b* show illustrative display trajectories 210 that can be displayed on the display unit 105 of the vehicle 100 on a second transit 213, e.g. on a return transit. Each of the display trajectories 210 can start at an actual position 300 of the vehicle 100 (the actual position 300 of the vehicle 100 being graphically represented on the display trajectory 210, for instance by way of a symbol for the vehicle 100). The display trajectory 210 may optionally be a driving path of the vehicle 100 for the second transit 213. Alternatively or additionally, the direction of travel of the vehicle 100 along the display trajectory 210 can be shown, e.g. by way of a sequence of arrows 501, 502.

FIG. 5*a* shows a driving situation in which the display trajectory 210 for the second transit 213 forms a loop, with the result that the display trajectory 210 intersects or crosses itself in a proximity region 320. The display trajectory 210 has a first segment 301 that, starting from the actual position 300 of the vehicle 100, approaches the proximity region 320. The first segment 301 is directly followed by a second segment 302 that is within the proximity region 320. The display trajectory 210 subsequently forms a loop (outside the proximity region 320), with the result that the display trajectory 210 enters and passes through the proximity region 320 again. In particular, the display trajectory 210 has a third segment 303 that runs through the proximity region 320 and that crosses the second segment 302 of the display trajectory 210 within the proximity region 320. Subsequently to the third segment 303, the display trajectory 210 continues outside the proximity region 320 in the example shown.

In the example depicted in FIG. 5*a*, multiple segments 302, 303 of the display trajectory 210 are therefore arranged within the proximity region 320, two segments 302, 303 of the display trajectory 210 intersecting (at a point of intersection 505) within the proximity region 320.

It is possible to identify the segment 302 that (starting from the actual position 300 of the vehicle 100) is (next and/or first) relevant to the transit 213 of the vehicle 100 through the proximity region 320. In the example depicted in FIG. 5a, this is the second segment 302, which is more relevant compared with the third segment 303, as the vehicle 100 will initially travel on the second segment 302 when currently traversing the proximity region 320, and will travel on the third segment 303 only when it next traverses the proximity region 320.

It is possible to cause the (second) segment 302 identified as relevant or more relevant to be highlighted compared with the (third) segment 303 identified as irrelevant or as less relevant. This can be achieved in particular by virtue of the third segment 303 being at least partially or fully hidden (and/or transparently represented) and/or by virtue of the one or more arrows 502 on the third segment 303 being partially or fully hidden (and/or transparently represented). It is therefore possible for the highlighting of the second segment 302 to be produced by visually diminishing (e.g. partially or fully hiding) the third segment 303.

FIG. 5b shows a display trajectory 310 for which the vehicle 100 performs a change of direction (e.g. within the context of a corrective move) within the proximity region 320. The vehicle 100 can be taken from the actual position 300 on a first segment 301 of the display trajectory 210 to the detected proximity region 320 in a first direction of travel (e.g. backward). Within the proximity region 320, the vehicle 100 initially proceeds on a second segment 302 of the display trajectory 210 in the first direction of travel as far as a point 515, at which the direction of travel changes. From this point onward, the vehicle 100 travels through the proximity region 320 and on out of the proximity region 320 on a third segment 303 in an (opposite) second direction of travel (e.g. forward).

In the proximity region 320, the second and third segments 302, 303 converge on one another and run directly beside one another, in particular in direct proximity to the point 515 at which the change of direction of travel takes place, with the result that it may be unclear to the user of the vehicle 100 on which segment 302, 303 the vehicle 100 will travel.

It is possible for the segment 302 of the display trajectory 210 that is (next) relevant to the second transit 213 in the proximity region 320 to be identified. The relevant segment 302 may be the segment that, starting from the actual position 300, is driven through next. The relevant segment 302 can then be highlighted compared with the one or more other segments 303 in the proximity region 320, this being able to be achieved in particular as a result of the one or more other segments 303 and/or arrows 502 on the one or more segments 303 being at least partially transparently represented (whereas the relevant segment 302 and/or arrows 502 on the relevant segment 302 are non-transparently represented).

The relevant segment 302 can be highlighted and/or the irrelevant segment 303 can be moderated while the vehicle 100 is travelling on a segment 301 in front of the relevant segment 302 and/or on the relevant segment 302. As soon as the vehicle 100 has left the relevant segment 302, the highlighting of the relevant segment 302 and/or the moderation of the irrelevant segment 303 can be terminated.

It is therefore possible to cause only the currently relevant path information to be displayed when two trajectories overlap, in particular when two different segments 302, 303 of a trajectory 210 overlap. The path or the path component 303 that will not be taken until later can be represented in a visually different manner (transparently and/or in a different color and/or in a different shape) or not at all. This can be done for all paths or segments 303 that follow the relevant path or the relevant segment 302 (i.e. the overlap), even if they are outside the proximity region 310, 320 (as depicted by way of illustration in FIGS. 5a and 5b).

An overlapping path may exist e.g. after a change of direction (as depicted by way of illustration in FIG. 5b). Furthermore, a path overlap may exist in the same direction of travel, e.g. on a circular transit, as depicted by way of illustration in FIG. 5a. A path overlap may also exist at a point of intersection 505.

Figure 5C:
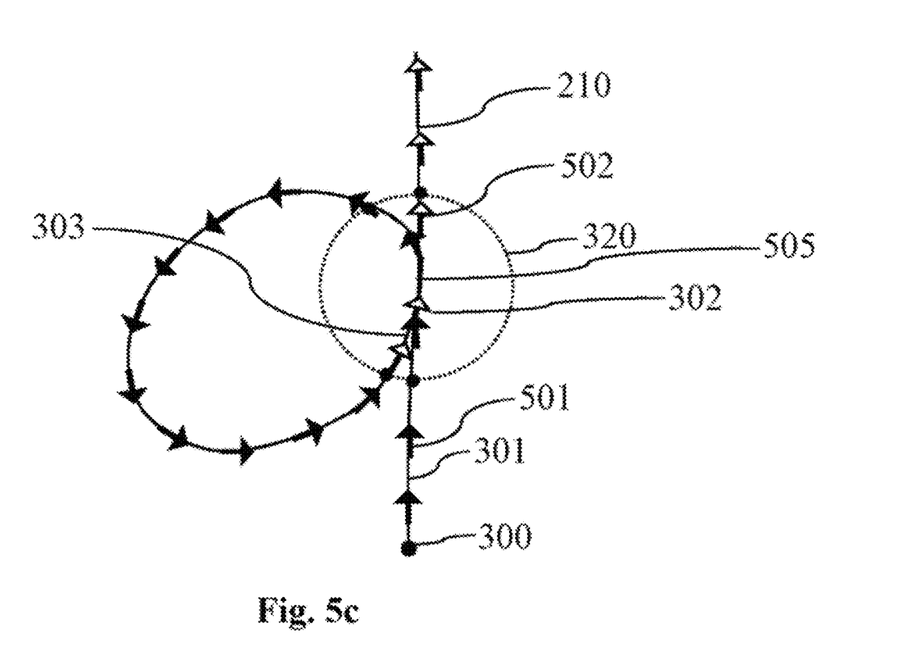

FIG. 5c shows a similar driving situation to FIG. 5a, in which the display trajectory 210 for the second transit 213 forms a loop, with the result that the display trajectory 210 intersects or crosses itself in a proximity region 320. In this case, an overlap between the second segment 302 and the third segment 303 exists in the proximity region 320. The proximity region 320 therefore corresponds (at least in part) to an overlap region.

Figure 5D:
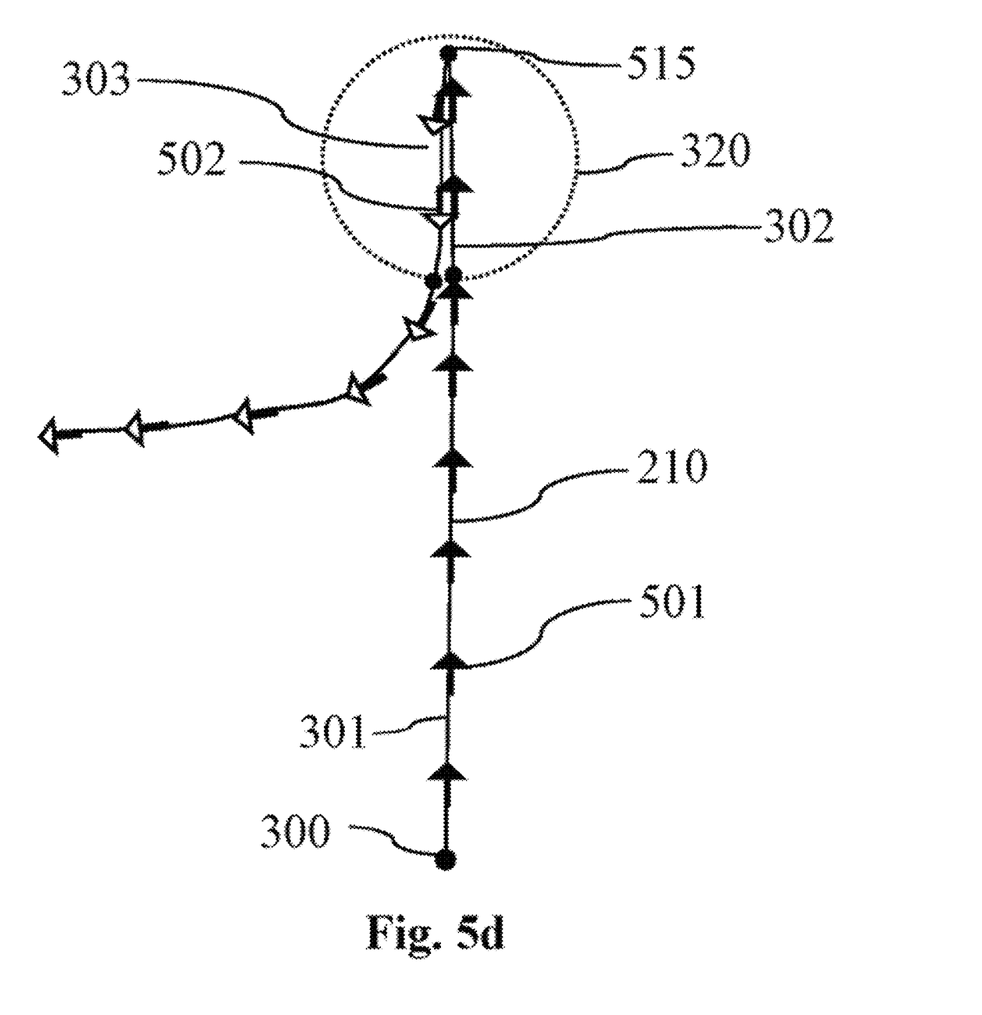

FIG. 5d shows a similar driving situation to FIG. 5b, wherein the second and third segments 302, 303 have an overlap, with the result that the proximity region 320 corresponds (at least in part) to an overlap region.

The portion of the third (i.e. irrelevant) segment 303 that overlaps the second (i.e. relevant) segment 302 can be at least partially hidden and/or transparently represented. Alternatively or additionally, the direction symbols 502 of the overlapping portion of the third segment 303 can be at least partially hidden and/or transparently represented.

Figure 4:
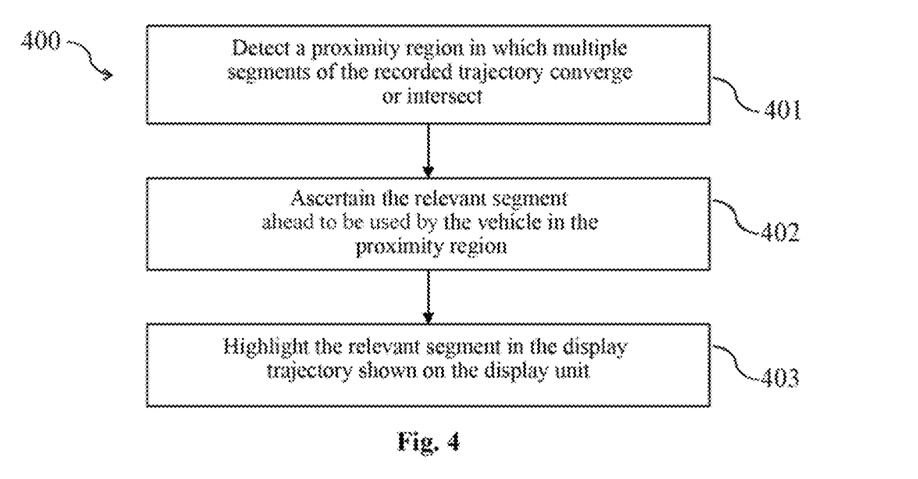
FIG. 4 shows a flowchart for an illustrative method for assisting a vehicle user on a transit along a recorded trajectory.

FIG. 4 shows a flowchart for a (optionally computer-implemented) method 400 for providing driver assistance on a second transit 213 along a trajectory 200 recorded within the context of a first transit 203 by displaying a display trajectory 210, corresponding to the recorded trajectory 200, on a display unit 105. The display unit 105 may be part of the vehicle 100 and/or part of a user device of the driver of the vehicle 100. The second transit can be produced in at least partially automated fashion by the vehicle 100 (in particular with regard to the lateral guidance).

The method 400 comprises, during the second transit 213, detecting 401 that the vehicle 100, starting from the (respective) actual position, is getting closer to a proximity region 310, 320 of the recorded trajectory 200 in which a plurality of different segments 302, 303 of the recorded trajectory 200 intersect, overlap and/or converge on one another. In other words, it is possible to detect that the vehicle 100 is getting closer to a proximity region 310, 320 of the recorded trajectory 200 in which multiple different segments 302, 303 of the recorded trajectory 200 would need to be shown on the display unit 105 (because the segments 302, 303 intersect or because the segments 302, 303 are relatively close together).

The method 400 further comprises ascertaining 402 at least one relevant segment 302 from the plurality of segments 302, 303 that, starting from the actual position 300 of the vehicle 100, is relevant to the second transit 213. The relevant segment 302 may be in particular the segment 302 via which the vehicle 100, starting from the actual position, will (next) drive through the proximity region 310, 320.

In addition, the method 400 comprises causing 403 the relevant segment 302 to be highlighted in the display trajectory 210 on the display unit 105 compared with one or more other segments 303 from the plurality of segments 302, 303. This can be achieved e.g. by using a specific color and/or intensity and/or line thickness for the relevant segment 302.

As already explained earlier on, the method 400 can be applied mutatis mutandis to a generic transit along a generic (optionally planned) trajectory.

The measures described in this document allow the convenience and reliability of the driver assistance system to be increased.

The present invention is not limited to the exemplary embodiments shown. In particular, it should be noted that the description and the figures are intended to demonstrate the principle of the proposed methods, devices and systems only by way of illustration.

What is claimed is:

1. A driver assistance system of a vehicle, comprising:
a controller communicatively coupled to a display unit that displays a display trajectory,
wherein the controller is configured to, during a transit of the vehicle along a trajectory corresponding to the display trajectory:
determine that the vehicle, starting from an actual position, is approaching a proximity region of the trajectory in which a plurality of different segments of the trajectory intersect, overlap and/or converge on one another,
ascertain at least one relevant segment from the plurality of segments that, starting from the actual position of the vehicle, is relevant to the transit, and
cause the display unit to highlight the relevant segment in the display trajectory compared with one or more other segments from the plurality of segments.

2. The driver assistance system of claim 1, wherein the trajectory is a first trajectory recorded within the context of a first transit; and wherein the transit is a second transit or the trajectory is a planned driving maneuver.

3. The driver assistance system of claim 1, wherein the controller is further configured to:
ascertain the segment from the plurality of segments as the relevant segment on which the vehicle is supposed to drive or will drive through and/or from the proximity region in order to follow the trajectory on the transit.

4. The driver assistance system of claim 1, wherein the controller is further configured to:
identify the one or more segments from the plurality of segments of the proximity region as relevant segments that follow the actual position of the vehicle next with regard to a direction of travel of the vehicle on the transit.

5. The driver assistance system of claim 1, wherein the controller is further configured to:
ascertain a distance between two different segments of the trajectory; and
determine that the two different segments form a proximity region of the trajectory if the ascertained distance is equal to or less than a predefined distance threshold value.

6. The driver assistance system of claim 1, wherein the controller is further configured to:
ascertain an angle between two intersecting segments of a proximity region of the trajectory; and
to ascertain and/or highlight the relevant segment for this proximity region on the basis of the angle between the two intersecting segments.

7. The driver assistance system of claim 6, wherein the controller is further configured to:
ascertain and/or highlight the relevant segment for this proximity region only if the ascertained angle between the two intersecting segments is in a predefined angle range equal to or less than ±20°.

8. The driver assistance system of claim 1, wherein the controller is further configured to:
highlight the relevant segment by:
hiding or graying out or transparently representing another segment from the plurality of segments,
using a different color and/or shading for the relevant segment than for the other segment from the plurality of segments, and/or
displaying a symbol that indicates the segment relevant to the transit.

9. The driver assistance system of claim 1, wherein the controller is further configured to:
use at least one camera of the vehicle to ascertain image data relating to surroundings of the vehicle that are in front of the vehicle in the direction of travel, and
take the image data as a basis for causing the display unit to show a graphical representation that displays the surroundings of the vehicle with the display trajectory overlaid.

10. The driver assistance system of claim 1, wherein the controller is further configured to, repeatedly during the transit:
ascertain a respective actual position of the vehicle,
ascertain whether or not, starting from the respective actual position, there is, ahead in the direction of travel, a proximity region of the trajectory with a relevant segment,
update the display trajectory on the basis of whether or not there is, ahead in the direction of travel, a proximity region of the trajectory with a relevant segment, and
cause the respective updated display trajectory to be shown on the display unit.

11. The driver assistance system of claim 1, wherein the control unit is further configured to:
ascertain, starting from the actual position of the vehicle, a plurality of proximity regions of the trajectory that are in front of the vehicle in the direction of travel of the vehicle on the transit,
ascertain a sequence of successive segments of the trajectory that are driven through in succession on the transit starting from the actual position,
identify the first segment from the sequence of segments that first forms a proximity region of the trajectory with a segment from the sequence of segments that is in front of the first segment, and
ascertain the at least one relevant segment from a set of segments that are in front of the first segment in the sequence of segments.

12. The driver assistance system of claim 1, wherein the control unit is further configured to:
laterally guide the vehicle along the trajectory in at least partially or fully automated fashion on the transit.

13. The driver assistance system of claim 1, wherein the control unit is further configured to:
detect that the trajectory has a loop with two segments that intersect at a point of intersection and/or that overlap in an overlap region; wherein a region around the point of intersection and/or the overlap region correspond/s to the proximity region, and
select the segment from the two segments that intersect at the point of intersection and/or that overlap in the overlap region as the relevant segment that is closest to the actual position along the trajectory.

14. The driver assistance system of claim 1, wherein the controller is further configured to:
- detect that the trajectory has two segments with opposite directions of travel and a change of direction of travel of the vehicle takes place at a direction-of-travel change point between the two segments, wherein a region around the direction-of-travel change point corresponds to the proximity region, and
- select the segment from the two segments as the relevant segment that is closest to the actual position along the trajectory.

15. The driver assistance system of claim 1, wherein the controller is further configured to: (a) at least partially or fully transparently show and/or at least partially or fully hide the one or more other segments from the plurality of segments, and/or (b) at least partially or fully transparently show and/or at least partially or fully hide one or more direction symbols on the one or more other segments from the plurality of segments, in order to highlight the relevant segment in the display trajectory on the display unit compared with the one or more other segments from the plurality of segments.

16. The driver assistance system of claim 1, wherein the controller is further configured to:
- at least partially or fully transparently show and/or at least partially or fully hide one or more segments of the trajectory that come after the relevant segment, and/or at least partially or fully transparently show and/or at least partially or fully hide one or more direction symbols on the one or more segments of the trajectory that come after the relevant segment.

17. The driver assistance system of claim 1, wherein the controller is further configured to:
- highlight the relevant segment in the display trajectory on the display unit compared with the one or more other segments from the plurality of segments only while the vehicle is arranged on a segment in front of the relevant segment in the direction of travel or on the relevant segment.

18. A method for the operation of a driver assistance unit of a motor vehicle during a transit of the vehicle along a trajectory corresponding to a display trajectory displayed on a display unit, the method comprising:
- detecting that the vehicle, starting from an actual position, is approaching a proximity region of the trajectory in which a plurality of different segments of the trajectory intersect, overlap and/or converge on one another;
- ascertaining at least one relevant segment from the plurality of segments of the proximity region that, starting from the actual position of the vehicle, is relevant to the transit; and
- causing the relevant segment to be highlighted in the display trajectory on the display unit compared with one or more other segments from the plurality of segments of the proximity region.

\* \* \* \* \*